Oct. 16, 1956 J. W. MULLEN II, ET AL 2,767,233
THERMAL TRANSFORMATION OF HYDROCARBONS
Filed Jan. 7, 1952 2 Sheets-Sheet 2
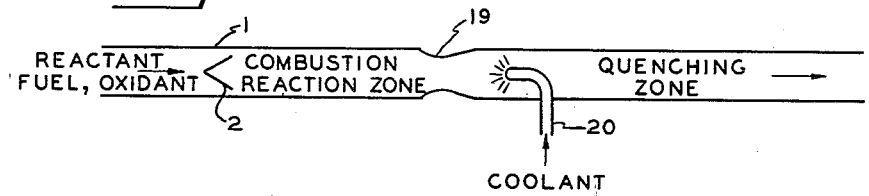
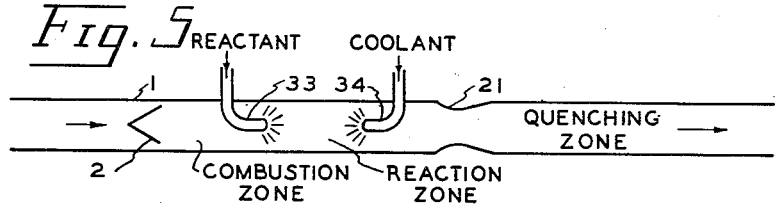
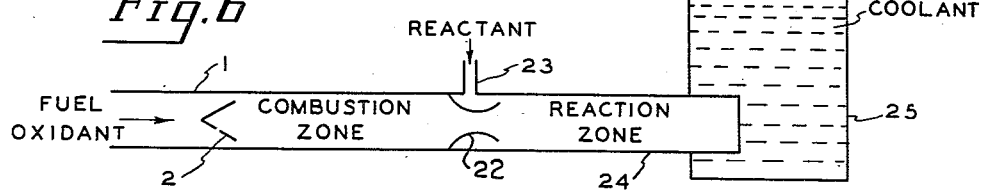
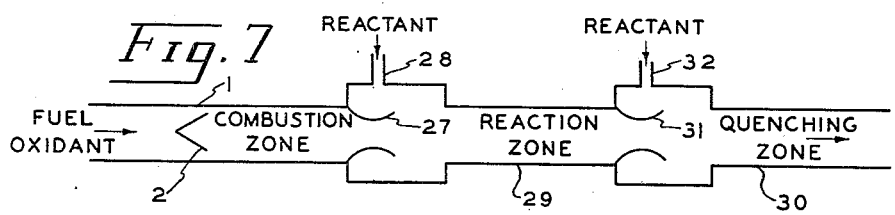
INVENTORS
JOHN B. FENN &
JAMES W. MULLEN II
BY Stowell + Evans
ATTORNEYS & nbsp;

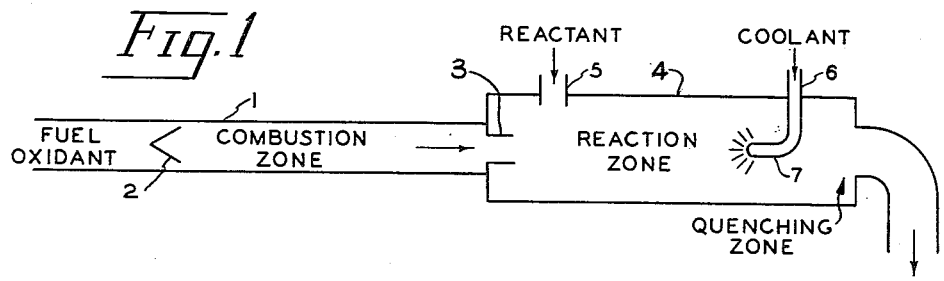
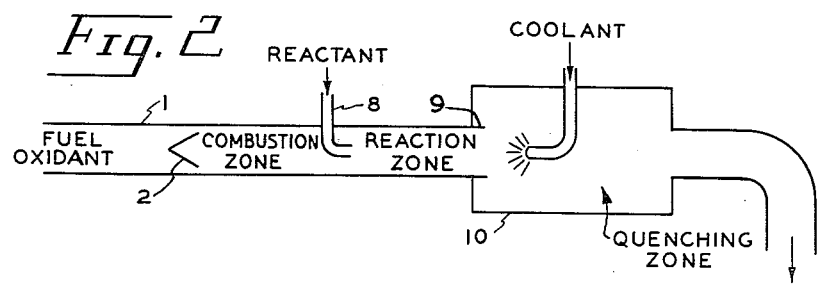
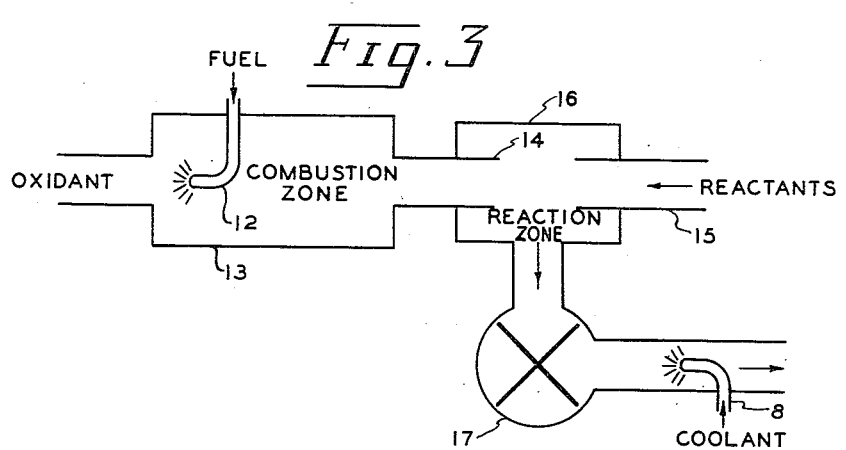

United States Patent Office 2,767,233
Patented Oct. 16, 1956

2,767,233

THERMAL TRANSFORMATION OF HYDROCARBONS

James W. Mullen II and John B. Fenn, Richmond, Va., assignors, by mesne assignments, to Chemical Construction Corporation, New York, N. Y., a corporation of Delaware Application January 7, 1952, Serial No. 265,292

5 Claims. (Cl. 260—679)

This invention relates to the thermal transformation of hydrocarbons into useful products and particularly to the production of acetylene by the thermal decomposition of hydrocarbons.

The disadvantages of present methods for effecting thermal transformation of hydrocarbons arise to a large extent from inherent difficulties in bringing about rapid and uniform heat transfer to the reactant hydrocarbons and rapid and uniform cooling of reaction products. When a gas is heated by means of heat exchanger wherein heat is supplied to one side of a wall or partition from a source such as combustion gases, steam, or hot liquids, the heat is carried by conductivity through the wall and is taken up on the other side by the gas which is to be heated to reaction temperature. The heat transfer rates which are possible in such equipment are relatively small. Consequently, high temperature gradients and large surfaces are necessary. More important for present considerations, however, is the fact that the heating of the reactant gas cannot be made uniform so that portions thereof are subjected to very high temperatures while other portions remain relatively cool and unreactive. In addition, since the rate at which the reactant gas can be heated up, and later cooled off, is slow, many side reactions occur and the reaction of interest may proceed further than is desirable with resultant loss in yield.

While improvement in heat transfer can be obtained by the direct mixing of hot gases such as superheated steam or hot combustion gases with the reactant gas, the rates of mixing of gases under the conditions of prior methods are so slow that the uniformity and rapidity with which the reactant is brought to the desired reaction temperatures are far short of those necessary to obtain optimum yields and freedom from side reactions. A result of these conditions inherent in prior processes is that one portion of the reactant is subjected to excessive heating while another portion is insufficiently heated, so that even though the average temperatures and times of heating are within the desired ranges only a small proportion of the reactant is actually treated in accordance with such measured average conditions.

It is a principal object of the present invention to provide an improved method for the thermal transformation of hydrocarbons whereby rapid and uniform heating of reactants and cooling of reaction products is obtained.

Another object of the invention is to provide an improved method for the production of acetylene.

Other objects and advantages of the invention will appear hereinafter.

We have found that very advantageous improvements in the thermal transformation of hydrocarbons can be obtained by introducing the hydrocarbons into high temperature combustion products of a fuel and a gaseous oxidant passing at very high velocity of at least 1000 feet per second through an elongated chamber. Among the advantages of the method of the invention are increased yields of useful transformation products, great reduction in the formation of carbon, and very great production capacities.

It is particularly advantageous to carry out the process under such conditions that the gaseous combustion products attain sonic velocity in a portion of the high temperature zone.

The necessary and sufficient condition for sonic velocity is that in the sonic zone the ratio of static pressure (e. g. from a wall pressure tap) to stagnation pressure (e. g. from a total head or pitot tube or from a static tap where the velocity is very low, say in an upstream enlargement in the duct) be about 1 to 2. Thus, in a ducted burner exhausting to atmospheric pressure (14.7 p. s. i. a.) if the air and fuel are supplied at about 30 p. s. i. a. (or 15 p. s. i. gauge), sonic velocity will obtain in the duct at the point of smallest area. However, it is not necessary that they be supplied at this high pressure if an appropriate nozzle is used together with a diffuser downstream from the nozzle throat. Thus air and fuel supplied at as low as 20 p. s. i. a. or lower can be brought to sonic velocity at the throat of a converging nozzle and then expanded back to atmospheric pressure prior to exhausting into the atmosphere. In this case the static pressure at the throat of the nozzle would still be half of the supply pressure or 10 p. s. i. a. but less than atmospheric pressure. The pump supplying the air would be required to deliver only at 20 p. s. i. a. even though final exhaustion was at 14.7 p. s. i. a. In other words, the ratio of 1 to 2 for static absolute pressure to stagnation absolute pressure in order to meet the requirements for sonic velocity relates only to the pressures in the sonic zone and does not necessarily relate to the overall initial and final pressures.

In cases where low pressures may favor a desired reaction it is possible to practice the invention at subatmospheric pressures, by use of vacuum pumps or exhausters in the downstream end of the burner-reaction duct. Again the requirement of a 1 to 2 pressure ratio for sonic velocity relates to the static and stagnation pressures in the sonic zone and not necessarily overall.

Thus by burning gasoline, for example, and air in a chamber maintained at pressures higher than about 15 pounds per square inch gauge, velocities above 3000 feet per second may be obtained. By working at higher pressures and using appropriate expanding nozzles, the velocity of the exhaust stream from the burner can be much higher than 3000 feet per second. If such a high velocity stream of hot gases is brought into confluence with a reactant stream, extremely rapid and uniform mixing of the two streams is obtained resulting in rapid and uniform heating of the reactant. Moreover, with appropriate configuration of the apparatus, the resulting stream of mixed combustion gases and reactant will retain a very high velocity, so that by controlling the length of the reaction duct very precise control of the length of reaction time can be obtained.

Another advantage arising from the maintenance of critical flow at the burner exit is that any pressure fluctuations which may occur downstream therefrom are not reflected in the burner itself. This is of great practical importance since one of the major difficulties in using combustion gases as a direct heating means has been the tendency of the burners to oscillate, flash back, detonate, and blow out. By shielding the combustion zone from pressure fluctuations these difficulties are eliminated. Moreover, the mass flow of combustion products from a burner exhausting at sonic velocity can be controlled very closely so that the temperature of the resulting mixture of combustion products and reactants can be maintained very near to the desired level by merely controlling the mass flow of the reactant stream. This is likewise very desirable since the temperature coefficients of many of the reaction rates of interest are quite large.

A further advantage is that in operating at high pressure a relatively small burner can provide a very large mass flow of combustion products and resultant heat release. For example, a ducted burner only two inches in diameter, two feet long, operating at a pressure of about 45 pounds per square inch gauge, and using a hydrocarbon fuel such as gasoline, will burn as much as a pound and a quarter of air per second resulting in almost 1500 B. t. u.'s per second of heat release.

Many other advantages accrue to the use of burners operating at pressures sufficiently high to maintain critical flow conditions at the exhaust. Such burners are conveniently referred to as being "choked" or operating under "choking" conditions. A burner can also be caused to "choke" by decreasing the pressure of the chamber into which it is exhausting rather than raising the pressure in the combustion zone.

The accompanying drawings diagrammatically illustrate several arrangements of apparatus for carrying out processes in accordance with the invention.

Referring to the drawings:

Fig. 1 shows an apparatus in which the reactant is introduced into hot combustion gases after they have attained high velocity;

Fig. 2 shows an apparatus in which the reactant is introduced into the combustion gases before they have attained high velocity;

Fig. 3 shows an apparatus in which the reactant is mixed with the hot combustion gas at high velocity;

Fig. 4 shows an apparatus in which the reactant is introduced together with the oxidant and fuel and coolant is introduced into the gas stream after cooling by expansion;

Fig. 5 shows an apparatus in which the reactant and the coolant are successively introduced prior to expansion of the gases to high velocity;

Fig. 6 illustrates an embodiment in which the reactant is introduced at the point of expansion of the gas to high velocity; and Fig. 7 illustrates apparatus in which a second supply of reactant serves as the coolant.

In Fig. 1 gaseous fuel and oxidant are introduced under pressure into one end of duct 1 which contains baffle 2 on which a flame is stabilized. Combustion of the fuel and oxidant is completed in the remainder of duct 1 which terminates in nozzle 3. As long as the static pressure in duct 1 is approximately twice that in chamber 4, the velocity of the combustion products in the throat of nozzle 3 will be sonic. A reactant stream is injected through tube 5 to mix with the high velocity stream of hot combustion products, the relative mass flows of the combustion products and the reactant stream being adjusted to give the required temperature in the resulting mixture. After a desired reaction time, determined by the velocity and distance of flow through chamber 4, the stream encounters a cooling spray obtained by introduction of a coolant, e. g. water through tube 6 to spray nozzle 7. Thereafter, the mixture of combustion gases, reactants, reaction products, and coolant is passed to a suitable separating means which is not shown. The whole of the apparatus can be water-jacketed so that ordinary materials of construction such as steel can be used without damage.

In Fig. 2 as in Fig. 1 fuel and oxidant are introduced under pressure into a duct 1 containing a flame stabilizing baffle 2 and are burned. In this case, however, the reactant is introduced into the hot combustion products through the tube 8 before sonic velocity is reached at the exit end of the duct. The time for mixing and reaction is thus determined by the length of duct 1 downstream from the injection point of the reactant to the exit end 9 of the duct 1. So long as the pressure in the combustion zone is roughly twice that in the quenching chamber 10, the resulting mixture of combustion products, reactants, and desired reaction products will leave the duct 1 at sonic velocity. However, because the temperature of the mixture will be lower on account of the presence of colder reactants, the velocity, though still sonic, will be somewhat lower than in the case illustrated in Fig. 1. The reason for this lower velocity is, of course, that the sonic velocity of a gas stream is determined by temperature to a large extent. The stream of combustion gases, reactants and reaction products encounters a coolant spray from nozzle 11 which quenches further reaction, after which the mixture is led to suitable separating means not shown.

Fig. 3 shows a variation of the invention in which a liquid fuel can be used by introducing it as a spray from the nozzle 12 into the incoming stream of oxidant in the combustion chamber 13. After combustion under pressure in chamber 13 the combustion gases are exhausted at sonic velocity from the end of the duct 14. The reactants in this case are introduced by contrastream injection through duct 15; the opposing of two high velocity streams, as in this case, leads to extremely rapid and thorough mixing. A suitable reaction time is determined by the size of reaction chamber 16. Another variation in this embodiment of the invention consists in the method of cooling. Since the mixture of combustion gases, reactants and reaction products can be at high pressure, it becomes feasible to accomplish a good portion of the cooling thereof, in order to quench the reaction, by expanding in a heat engine such as turbine 17. This method of cooling is very rapid and homogeneous in the sense that cooling is uniform throughout the gas mixture and does not depend upon contact with a surface, whether water spray or heat exchanger. Moreover, useful amounts of power are recovered from the turbine. Although sufficient cooling to quench the reaction mixture can be obtained by expansion through the turbine, further cooling in order to facilitate separation of the desired products can be secured by contact with coolant spray from the nozzle 18 after the turbine.

Fig. 4 shows a method of practicing the invention in which the reactants are introduced along with the fuel and oxidant directly into the combustion chamber. In this case very intimate contact of reactant with the combustion gases is assured. This configuration is particularly useful when partial oxidation products of hydrocarbons are desired. In fact, the reactant and fuel can be the same chemical species. For example, natural gas and air may be introduced under pressure into the duct 1 containing a stabilizing baffle 2. Part of the natural gas is burned, thus providing heat for promotion of the reaction of another part of the natural gas with some of the oxygen of the air to form formaldehyde. The secret in obtaining good yields of formaldehyde lies in very rapid quenching of the reaction, since formaldehyde decomposes very rapidly at high temperatures into water and carbon monoxide. In point of fact the expansion which naturally takes place after critical flow in throat 19 does effectively stop further reaction. The reason for this is that the static temperature of the stream drops abruptly upon expansion to high velocity, the static temperature drop being equivalent to the increase in kinetic energy of flow due to the increase in stream velocity. Since the static temperature, i. e. kinetic energy of the molecules due to random motion, is the controlling factor in chemical reaction rate, the sudden conversion of random energy (temperature) into velocity energy (flow) upon expansion through the nozzle 19, effectively lowers the temperature and therefore the reaction rate so that the mixture is quenched. Of course, in such a case when the stream velocity is slowed down subsequently, at least a substantial portion of the velocity energy is reconverted to static temperature which would result in further reaction. However, if a coolant is sprayed into the stream while it is at high velocity the mixture will be cooled sufficiently so that the temperature rise upon slowing down the stream will not be sufficient to start reaction again.

This is the reason for coolant spray 20. The configuration of Fig. 4 is also adapted to the manufacture of acetylene. If methane and oxygen are introduced as the fuel-oxidant-reactant mixture, methane being present in considerable excess of the amount required to burn the oxygen, the excess methane is cracked to acetylene in good yield.

Fig. 5 shows an arrangement in which first the reactant and then the coolant are injected through nozzles 33 and 34 respectively into the hot combustion gases prior to their attainment of sonic velocity at throat of nozzle 21. Here advantage is again taken of the lowering of static temperature upon expansion throught a nozzle, with the added advantage that coolant is already dispersed through the stream so that good contact and further cooling of the mixture after expansion will occur rapidly.

Fig. 6 illustrates an embodiment of the invention in which the combustion gases are expanded after reaching sonic velocity in the throat of nozzle 22. The resulting supersonic stream aspirates the reactant by familiar jet pump action through inlet duct 23 and mixes thoroughly therewith in the reaction zone 24. The cooling means shown here comprises introducing the reaction mixture beneath the surface of a body of a coolant liquid, e. g. water maintained in container 25. The high velocity of the mixture brings about excellent contact with the water and provides for rapid cooling.

Fig. 7 represents a variation of the invention in which quenching of the reaction mixture is obtained by dilution with further reactant. Fuel and oxidant are introduced under pressure as before into the burner 1, and after being burned are expanded to supersonic velocity through nozzle 27. The high velocity stream of hot combustion gases then entrains reactants introduced through duct 28 and the resulting mixture is allowed to react for a time depending upon the length of duct 29 comprising the mixing zone. In this case the pressure in burner 1 must be sufficiently high so that even after expansion through nozzle 27 and entrainment of reactant, the pressure in reaction zone 29 will be sufficiently higher than the pressure in quenching zone 30 so that sonic velocity will also be obtained in throat of nozzle 31. Excess reactant, sufficient to cool the overall mixture below reaction temperature, is permitted to enter through duct 32 and is entrained and mixed with reaction mixture leaving nozzle 31, thereby quenching the reaction mixture in quenching zone 30. Thereafter the mixture is led to suitable separating means (not shown). This configuration is particularly adapted to a recycling operation in which a portion of the excess reactant can be separated and returned as fuel to the burner. Relatively pure oxygen would be the desired oxidant under these conditions since the problem of removing large quantities of diluent nitrogen, present when air is the oxidant, would be eliminated.

The above illustrations indicate to some extent the variety of arrangements of apparatus to which the invention is adapted. There are many other possible configurations which take advantage of the essential features of the invention. The important and novel feature is the use of very high flow velocities, preferably sonic velocities, at the exhaust of the burner which is providing the heat necessary to bring about the desired reaction. This condition of sonic flow, or choking, at once provides for stability in the combustion of fuel and oxidant by making the burner insensitive to pressure variations downstream from the exhaust, permits flexibility in the control of mass flow through the burner by simple adjustment of the combustion chamber pressure, and makes possible very rapid and uniform heating and cooling of the reactants under controlled conditions because of the high velocities and pressures. Furthermore, if a portion of the cooling is accomplished by expansion through a heat engine, a substantial amount of power can be recovered which represents a considerable net saving over other processes which involve the use of combustion gases as a direct heating means. Only by operating at relatively high pressure ratios can the heats of combustion and reaction be directly and readily recovered as power. Most important, however, is the nature of the control of reaction time which can be effected on account of the high velocities. When it is considered that in oxidation reactions of hydrocarbons, for example, the reaction time to go all the way to carbon dioxide and water is of the order of small fractions of milliseconds, it is apparent that in order to spread the reaction zone to reasonable dimensions so that quenching of the reaction at intermediate stages becomes possible, velocities of the order of thousands of feet per second are necessary. The present invention provides a means of obtaining such velocities. The necessity for rapid cooling also is apparent, and the relatively high pressure ratios and velocities available when practicing the invention make this possible. Similar considerations obtain in many other high temperature reactions since reaction rates in general are an exponential function of temperatures.

Thus far the invention has been discussed generally in relation to its principles of operation. It will be apparent that its scope is not limited to any particular set of conditions but that advantages will be applicable to many circumstances. However, the practice of the invention is particularly adapted to certain processes. Any fuel-oxidant system which gives rise to gaseous products can be used as a heat source for chemical conversion processes. However, only a few are of practical importance because of availability and cheapness. Air of course is the cheapest oxidant, and its use is well adapted to practice of the invention. There is required only sufficient pumping capacity to provide the necessary quantities at the pressures desired in the combustion chamber in order to obtain high velocity conditions at the exhaust. The main disadvantage in using air resides in the large quantity of diluent nitrogen, which complicates subsequent separation steps after the reaction. This difficulty can be avoided if relatively pure oxygen is used as the oxidant, since the combustion products are water and carbon dioxide, which are relatively easily removed from the reaction mixture. The question as to whether air or oxygen should be used will be determined by the costs of the material relative to the costs of subsequent separation of the reaction products. Either of these oxidants is admirably adapted to the practice of the invention.

With respect to the fuels to be used, fundamentally it is only necessary that the combustion products be essentially gaseous. Since the heat generation step can be carried out entirely independently of the cracking or other thermal reaction step, a wide freedom in the choice of fuel while using the most desirable reactant without consumption of the latter for heat generation is provided. Again, however, economic considerations will dictate the choice. Wherever natural gas is readily available, its use is desirable because of the low cost. However, liquid hydrocarbons, water gas, producer gas, blast furnace gas, or even coal may be employed. The main difficulty in using coal or other solid fuels is in feeding them to the combustion chamber under pressure. Liquids or gases are readily pumped in against pressure whereas the movement of solids against a pressure head is more difficult. If hydrogen is available together with cheap oxygen, the practice of the invention is very advantageous because of the fact that water is the only combustion product, and it is very readily separated from the reaction mixture. In this connection, mention should be made of the oxidant fuel ratios preferably employed in the practice of the invention. We have found that when oxidation of the reactants is to be avoided, it is dseirable to have at least stoichiometric amounts of fuel and oxidant present so that all the oxygen will be consumed by reaction with the fuel. Conversely, if an oxidizing atmosphere is desired, less than stoichiometric quantities of fuel are employed. Reducing atmospheres are achieved by having fuel present in excess of stoichiometric amounts. Temperature can also be controlled to some extent by adjustment of the oxidant to fuel ratios. Maximum temperatures are obtained when stoichiometric or slightly fuel-rich mixtures are employed. Lower temperatures result if the mixture is on the lean or rich side. Where the oxidizing or reducing nature of the combustion products is important, however, temperature must be controlled largely by the relative mass flows of combustion products and reactants and by controlling the preheat of the air-fuel mixture or the reactant stream, or both. There is also the possibility (not illustrated) of injecting a coolant such as water before mixing the combustion products with the reactant stream. This latter expedient is of particular advantage when a neutral stream of combustion products at a temperature lower than the flame temperature is desired.

The separation of the heat generation from the reaction also makes possible a wide range of control of the composition of the reaction mixture. For example, in the production of acetylene by using hydrogen or natural gas as fuel and fuel oil as the reactant it is possible to provide a high temperature gas stream having a low carbon dioxide content and a high water content while having a high carbon to hydrogen ratio in the reactant itself. These conditions are particularly conducive to a high concentration of acetylene in the off-gas.

This separation also makes possible complete utilization of the fuel since it can be completely burned before the reactant is introduced thus providing a high thermal efficiency in utilization of fuel independent of the reaction desired. It also makes possible a wide range of reactant flows since it is not necessary to maintain composition within the limits of flammability in the reacton zone as in certain prior processes.

In general, in the production of acetylene it is desirable that the temperature of the reaction zone be at least 1300° K. and preferably above 1450° K. A reaction time in the range of $10^{-1}$ to $10^{-4}$ seconds preferably about $10^{-2}$ seconds is desirable. Of course the optimum reaction time is less the higher the temperature of the reaction zone.

The principles of the invention are more particularly illustrated in the following examples relating to the production of acetylene and ethylene and to the reforming of hydrocarbons.

*Example 1.—Acetylene*

A homogeneous mixture of stoichiometric quantities of pentane and air is preheated to 400° K. and introduced at a mass flow of .78 lb./sec. into a stainless steel duct (1 of Fig. 1) of 1.875 inch inside diameter, wherein it is burned in a ram-jet type burner provided with an oxyhydrogen pilot burner which is stoichiometrically adjusted and provides 3% of the total heat supplied to the system. The pilot burner acts as the flame holder (2 of Fig. 1) and provides smooth continuous burning in the "tail-pipe," an extension of the duct 22½ inches in length from the pilot burner to the reaction chamber 4, comprising a 6 foot stainless steel tube of 3.875 inch inside diameter. The static pressure in the burner 1, six inches upstream from the pilot 2 is 31 p. s. i. g. under these conditions. The final 12 inches of the combustion section 1 is sprayed with water to prevent burning out. At a point 1½ inches upstream from the reaction chamber 4 liquid pentane is injected into the combustion gases through four ¼ inch stainless steel tubes equidistantly spaced around the circumference at a rate of .080 lb./sec. The gas stream cooled with water at the end of the reaction chamber contains 4.1% of acetylene (dry basis). The absence of carbon formation in this and in the following examples is a particularly advantageous feature of the invention as carbon particles are difficult to remove or scrub out of the gas stream in commercial operation.

*Example 2.—Acetylene*

This example is similar to Example 1 except that kerosene is injected into the combustion gases at a rate of .10 lb./sec. in place of the pentane of Example 1. The reaction gases at the end of the reaction chamber contain 3.7% acetylene (dry basis).

*Example 3.—Acetylene*

In this example, liquid propane is injected into the reaction gases at the rate of .081 lb./sec. and a gas stream containing 3.3% of acetylene is produced.

*Example 4.—Acetylene*

When methane is introduced into the combustion gases instead of the hydrocarbons of the preceding examples, a substantial yield of acetylene in the reaction gases is likewise produced.

*Example 5.—Ethylene*

When the amount of liquid pentane introduced into the combustion gases, as in Example 1, is increased to .187 lb./sec. the water-cooled reaction gases at the end of the reaction chamber contain 13.1% of ethylene.

*Example 6.—Gas reforming-synthesis gas*

A stoichiometric mixture of oxygen and methane preheated to 400° K. is burned in the apparatus described in Example 1. The oxyhydrogen pilot provides 2% of the heat imparted to the system. At a point 2½ inches upstream from the reaction chamber .4 methane, preheated to 400° K. is injected at the rate of .465 lb./sec. through six stainless steel tubes equidistantly spaced around the circumference. The reaction gases at the end of the reaction chamber, at a temperature of about 1250° K. are quenched with a water spray and provide a synthesis gas containing hydrogen and carbon monoxide in the ratio of two to one.

By adjusting the water spray used for quenching to a mass flow of 1.103 lbs./sec. whereby the temperature of the gases is lowered from about 1250° K. to about 675° K., and passing the resulting gaseous mixture through a second reaction chamber containing a catalyst activating the conversion of carbon monoxide and water to carbon dioxide and hydrogen, a hydrogen and carbon dioxide containing gas having a very low carbon monoxide content is produced.

There are many modifications possible in conjunction with the practice of the invention which will be apparent to those skilled in the art and have not been discussed in detail. For example, preheating the reactant feed stock to some temperature below that at which rapid reaction takes place and using the combustion products only for the final temperature rise may simplify subsequent separation steps by reducing the proportion of combustion products present in the reaction mixture. Further, by preheating the oxidant and fuel before entrance into the combustion chamber, considerably higher temperatures and velocities can be obtained in the exhaust stream. In the production of acetylene preheating to temperatures of the order of 1000° K. or higher is desirable, the upper limit for preheating being determined practically only by materials of construction and coking of the hydrocarbon feedstocks. The use of burners of the type used in turbo-jet power plants are suited to particular installations. With such a burner, part of the energy of the combustion reaction is used directly to pump air to the burner in order to get the desired pressure level.

Catalysts may be employed in the reactions by introducing them in finely divided form with the fuel or oxidant or reactant or by interposing the catalyst in fixed position in the path of the gases.

These and many other modifications are possible without departing from the principle of the invention which is the introduction of a hydrocarbon reactant into hot combustion gases in an elongated chamber in at least a portion of which the gases flow at a high velocity, at least 1000 feet per second, and preferably at sonic velocity or over, and thereafter quickly cooling the reaction gases and recovering the reaction product therefrom.

Although the use of sonic velocities in the combustion gases used for heating the reactants is very advantageous in the practice of the invention, it is not always necessary that this condition of critical flow exist. It is sometimes possible to obtain the desired mixing and reaction-time-space relationships at velocities that are considerably below sonic velocity. The essential feature of the invention consists in taking advantage of the rapid and uniform mixing between hot combustion gases and reactants when the former are flowing at high velocity at the time of admixture with the latter. We have found that velocities as low as 1000 feet per second can provide this rapid mixing. Depending upon the temperature of the gases, 1000 feet per second can be almost any fraction of sonic velocity. Below this value the mixing rates begin to drop off. When subsonic flow velocities are employed certain of the advantages of sonic velocity, such as shielding the combustion zone from downstream pressure fluctuations, are lost. However, for some reactions in which the rates are not too rapid so that velocities of 1000 feet per second will provide sufficient extension of the reaction zone in space to permit adequate control, it may be desirable to employ these lower than sonic velocities in order to decrease pumping or compressor costs.

This application is a continuation-in-part of our application Serial No. 165,762, filed June 2, 1950.

We claim:

1. A method of effecting thermal transformation of hydrocarbons which comprises continuously burning a flowing mixture of fuel and gaseous oxidant within an elongated chamber and exhausting the resulting gases at a static pressure not more than about one-half of the pressure of combustion and thereby producing within said chamber a high temperature zone in at least part of which the gaseous combustion products flow at a velocity of at least 1,000 feet per second, the rate of supply of said mixture of fuel and oxidant being such as to produce within said high temperature zone a temperature of at least 1400° K., introducing an aliphatic hydrocarbon into said high temperature zone, quickly cooling the reaction product-containing combustion products and recovering the hydrocarbon reaction products therefrom.

2. A method of producing acetylene which comprises continuously burning a flowing mixture of fuel and a gaseous oxidant in an elongated chamber and exhausting the resulting gases at a static pressure not more than about one-half of the pressure of combustion and thereby producing within said chmaber a high temperature zone in at least part of which the gaseous combustion products flow at a velocity of at least 1000 feet per second, the rate of supply of said mixture of fuel and gaseous oxidant being such as to produce within said high temperature zone a temperature of at least 1400° K., introducing an aliphatic hydrocarbon into said zone and forming acetylene therefrom by the high temperature and high velocity conditions existing therein, quickly cooling the acetylene-containing combustion products, and recovering the acetylene therefrom.

3. A method of producing acetylene which comprises continuously burning a flowing mixture of a hydrocarbon fuel and a gaseous oxidant in an elongated chamber and exhausting the resulting gases at a static pressure not more than about one-half of the pressure of combustion and thereby producing within said chamber a high temperature zone in at least part of which the gaseous combustion products flow at a velocity of at least 1000 feet per second, the rate of supply of said mixture of fuel and gaseous oxidant being such as to produce within said high temperature zone a temperature of at least 1400° K., introducing an aliphatic hydrocarbon into said zone and forming acetylene therefrom by the high temperature and high velocity conditions existing therein, quickly cooling the acetylene-containing combustion products, and recovering the acetylene therefrom.

4. A method of producing acetylene which comprises continuously burning a flowing mixture of fuel and a gaseous oxidant in an elongated chamber and exhausting the resulting gases at a static pressure not more than about one-half of the pressure of combustion and thereby producing within said chamber a high temperature zone in at least part of which the gaseous combustion products flow at a velocity of at least 1000 feet per second, the rate of supply of said mixture of fuel and gaseous oxidant being such as to produce within said high temperature zone a temperature of at least 1400° K., injecting a stream of aliphatic hydrocarbon reactant into the gases in said zone and bringing about a practically instantaneous mixing of said hydrocarbon with said gases by the high linear velocity thereof, forming acetylene from said hydrocarbon by the high temperature and high velocity conditions existing in said zone, quickly cooling the acetylene-containing combustion products, and recovering the acetylene therefrom.

5. A method of producing acetylene which comprises continuously burning a flowing mixture of fuel and a gaseous oxidant preheated to a temperature of about 400° K. in an elongated chamber and exhausting the resulting gases at a static pressure not more than about one-half of the pressure of combustion and thereby producing within said chamber a high temperature zone in at least part of which the gaseous combustion products flow at a velocity of at least 1000 feet per second, the rate of supply of said mixture of fuel and gaseous oxidant being such as to produce within said high temperature zone a temperature of at least 1400° K., injecting a stream of aliphatic hydrocarbon reactant into the gases in said zone and bringing about a practically instantaneous mixing of said hydrocarbon with said gases by the high linear velocity thereof, forming acetylene from said hydrocarbon by the high temperature and high velocity conditions existing in said zone, quickly cooling the acetylene-containing combustion products, and recovering the acetylene therefrom.

References Cited in the file of this patent

UNITED STATES PATENTS

| Number | Name | Date |
|---|---|---|
| 2,217,649 | Goddard | Oct. 8, 1940 |
| 2,343,866 | Hincke | Mar. 14, 1944 |
| 2,351,750 | Fawkes | June 20, 1944 |
| 2,398,201 | Young | Apr. 9, 1946 |
| 2,423,527 | Steinschlaeger | July 8, 1947 |
| 2,433,943 | Zwicky et al. | Jan. 6, 1948 |
| 2,498,444 | Orr | Feb. 21, 1950 |
| 2,520,149 | Keeling | Aug. 29, 1950 |
| 2,546,042 | Oberfell et al. | Mar. 20, 1951 |
| 2,566,319 | Deacon | Sept. 4, 1951 |
| 2,630,461 | Sachsse et al. | Mar. 3, 1953 |
| 2,692,480 | Viaud et al. | Oct. 26, 1954 |
| 2,695,216 | Peck et al. | Nov. 23, 1954 |

FOREIGN PATENTS

| 20,697 of 1907 | Great Britain | Sept. 17, 1908 |

OTHER REFERENCES

"Rockets" (1944 ed.), pages 176–181. Viking Press, New York.

"Rocket Propulsion Elements," by G. P. Sutton (1949), pages 9, 33, 88, 90, John Wiley and Sons, New York.